United States Patent [19]
Gotoh et al.

[11] Patent Number: 5,974,794
[45] Date of Patent: Nov. 2, 1999

[54] EXHAUST GAS PURIFICATION DEVICE FOR AN INTERNAL COMBUSTION ENGINE

[75] Inventors: Masato Gotoh, Susono; Kenji Katoh, Shizuoka; Takamitsu Asanuma, Susono, all of Japan

[73] Assignee: Toyota Jidosha Kabushiki Kaisha, Aichi-Ken, Japan

[21] Appl. No.: 09/054,172

[22] Filed: Apr. 2, 1998

[30] Foreign Application Priority Data

Apr. 3, 1997 [JP] Japan ................................. 9-085294

[51] Int. Cl.⁶ ................................................. F01N 3/00
[52] U.S. Cl. .............................. 60/286; 60/295; 60/284; 60/285
[58] Field of Search .............................. 60/285, 286, 284, 60/295, 303

[56] References Cited

U.S. PATENT DOCUMENTS

| | | | |
|---|---|---|---|
| 5,388,403 | 2/1995 | Nagami et al. | 60/276 |
| 5,404,719 | 4/1995 | Araki et al. | 60/276 |
| 5,406,790 | 4/1995 | Hirota et al. | 60/276 |
| 5,473,887 | 12/1995 | Takeshima et al. | 60/276 |
| 5,740,669 | 4/1998 | Kinugasa et al. | 60/285 |

FOREIGN PATENT DOCUMENTS

WO9325806 12/1993 WIPO .

Primary Examiner—F. Daniel Lopez
Assistant Examiner—Binh Tran
Attorney, Agent, or Firm—Kenyon & Kenyon

[57] ABSTRACT

The exhaust gas purification device includes a $NO_x$ absorbent disposed in an exhaust gas passage of an internal combustion engine. The engine is mainly operated at a lean air-fuel ratio. The $NO_x$ absorbent absorbs $NO_x$ in the exhaust gas from the engine when the exhaust gas flowing into the $NO_x$ absorbent is at a lean air-fuel ratio, and releases the $NO_x$ absorbed therein and reduces it when the air-fuel ratio of the exhaust gas becomes a rich air-fuel ratio. A control circuit is provided for controlling the operating air-fuel ratio of the engine. When the ignition switch of the engine is turned off, the control circuit continues the engine operation for a predetermined period before terminating the engine operation. During this engine operation, the operating air-fuel ratio of the engine is controlled at a rich air-fuel ratio to supply exhaust gas with a rich air-fuel ratio to the $NO_x$ absorbent. Therefore, $NO_x$ absorbed and held therein when the ignition switch is turned off is released and reduced by the rich air-fuel ratio exhaust gas from the engine. Since the $NO_x$ absorbent is maintained at the condition where no $NO_x$ remains in the $NO_x$ absorbent after the engine has stopped, unreduced $NO_x$ is not released from the $NO_x$ absorbent even if the $NO_x$ absorbent is cooled after the engine has stopped.

13 Claims, 8 Drawing Sheets

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine. More specifically, the present invention relates to exhaust gas purification device which includes an $NO_x$ absorbent for removing $NO_x$ in the exhaust gas of an internal combustion engine.

2. Description of the Related Art

An exhaust gas purification device which disposes a $NO_x$ absorbent in an exhaust gas passage of an internal combustion engine is known in the art. A $NO_x$ absorbent absorbs $NO_x$ in the exhaust gas when the exhaust gas from an engine is at a lean air-fuel ratio, and releases the absorbed $NO_x$ and reduces it when the exhaust gas from the engine is at a rich air-fuel ratio. An exhaust gas purification device of this type is, for example, disclosed in international patent publication WO93-25806. In the exhaust gas purification device in the '806 publication, a $NO_x$ absorbent is used for absorbing $NO_x$ in the exhaust gas of a lean-burn engine which can be operated at an lean air-fuel ratio. The device in the '806 publication is provided with means for detecting the amount of the $NO_x$ absorbed in the $NO_x$ absorbent and monitors the amount of the absorbed $NO_x$ during the lean air-fuel ratio operation of the engine. When the amount of the absorbed $NO_x$ reaches a predetermined value, the device lowers the oxygen concentration in the exhaust gas in order to cause the $NO_x$ absorbent to release the absorbed $NO_x$ and reduce the same using reducing substances such as HC, CO in the exhaust gas (in this specification, the operation which causes the $NO_x$ absorbent to release the absorbed $NO_x$ and reduce the released $NO_x$ to $N_2$ is referred to as "a regenerating operation"). The device in the '806 publication prevents the $NO_x$ absorbent from being saturated with the absorbed $NO_x$ by performing the regenerating operation when the amount of the $NO_x$ absorbed in the $NO_x$ absorbent reaches the predetermined value.

However, in the device of the '806 publication, there is a problem in that the absorbed $NO_x$ may be released from the $NO_x$ absorbent after the engine has stopped and then diffuse into the atmosphere. As explained later, the maximum amount of $NO_x$ which can be absorbed and held by the $NO_x$ absorbent, i.e., a $NO_x$ saturating amount varies depending on the temperature of the $NO_x$ absorbent. Usually, the $NO_x$ absorbent is disposed in the exhaust gas passage at a position where the temperature of the $NO_x$ absorbent falls in a range where the $NO_x$ saturating amount becomes the maximum value (for example, 300° C. to 500° C.), and the above-noted predetermined value of the absorbed $NO_x$ at which the regenerating operation is commenced is set at a relatively large value (for example, 70 to 80% of the maximum $NO_x$ saturating amount in the above temperature range). Therefore, if the engine is stopped immediately before the $NO_x$ amount absorbed in the $NO_x$ absorbent reaches the above-noted predetermined value, a substantially large amount of $NO_x$ is held in the $NO_x$ absorbent after the engine has stopped. However, since the temperature of the $NO_x$ absorbent decreases due to heat radiation from the $NO_x$ absorbent after the engine has stopped, the $NO_x$ saturation amount (i.e., the maximum amount of $NO_x$ which the $NO_x$ absorbent can hold) decreases. Therefore, when the $NO_x$ saturation amount becomes lower than the amount actually held in the $NO_x$ absorbent due to the cooling of the $NO_x$ absorbent, the amount of $NO_x$ in excess of the $NO_x$ saturating amount is released from the $NO_x$ absorbent and diffuses into the atmosphere without being reduced. The amount of the $NO_x$ diffusing into the atmosphere increases in proportion to the maximum $NO_x$ saturation amount of $NO_x$ absorbent, i.e., a $NO_x$ absorbing capacity of the $NO_x$ absorbent. Therefore, if the $NO_x$ absorbent having a large $NO_x$ absorbing capacity is used, the amount of $NO_x$ diffused into the atmosphere after the engine has stopped also become large.

This problem may not occur if the above-noted predetermined value of the absorbed $NO_x$ at which the regenerating operation is commenced (hereinafter, referred to as "a regenerating amount") is set at a relatively low value. By setting the regenerating amount at lower value, the maximum amount of $NO_x$ absorbed and held in the $NO_x$ absorbent during the engine operation becomes low. Therefore, if the regenerating amount is set at a sufficiently low level, the amount of $NO_x$ held in the $NO_x$ absorbent when the engine is stopped never exceeds the $NO_x$ saturating amount even if the $NO_x$ saturation amount decreases after the engine has stopped due to the cooling of the $NO_x$.

However, if the regenerating amount is set at a lower value, the $NO_x$ absorbing capacity of the $NO_x$ absorbent cannot be fully utilized. For example, if the regenerating amount is set at, for example, 20% of the maximum $NO_x$ saturating amount instead of conventional 70 to 80%, the frequency of the regenerating operation during the engine operation increases by roughly three times. When the frequency of the regenerating operation increases, problems such as a deterioration in the driveability due to changes in the operating air-fuel ratio of the engine and a worsening of a fuel economy of the engine may occur. Therefore, the solution by setting the regenerating amount at a lower value is not practical.

SUMMARY OF THE INVENTION

In view of the problems in the related art as set forth above, the object of the present invention is to provide an exhaust gas purification device which is capable of fully utilizing the $NO_x$ absorbing capacity of a $NO_x$ absorbent without causing unreduced $NO_x$ to be released to the atmosphere after the engine has stopped.

This object is achieved by an exhaust gas purification device for an internal combustion engine which comprises a $NO_x$ absorbent disposed in an exhaust passage of an internal combustion engine, wherein the $NO_x$ absorbent absorbs $NO_x$ in the exhaust gas of the engine when the air-fuel ratio of the exhaust gas flowing into the $NO_x$ absorbent is lean, and releases and reduces the absorbed $NO_x$ when the air-fuel ratio of the gas flowing into the $NO_x$ absorbent becomes rich, and a regenerating means for performing a regenerating operation which causes the $NO_x$ absorbent to release and reduce the absorbed $NO_x$ by supplying a rich air-fuel ratio gas to the $NO_x$ absorbent when the engine is stopped.

According to the present invention, the $NO_x$ absorbent also holds a certain amount of $NO_x$ when the engine is stopped. This amount of $NO_x$ may be large when the $NO_x$ absorbing capacity of the $NO_x$ absorbent is large. Therefore, unreduced $NO_x$ may be released to the atmosphere if the $NO_x$ absorbent is cooled after the engine has stopped. However, according to the present invention, the regenerating means performs the regenerating operation when the engine is stopped and this causes the $NO_x$ absorbent to release the absorbed $NO_x$ and reduce the same. Therefore, when the regenerating operation is completed after the engine has stopped, the amount of $NO_x$ held in the $NO_x$ absorbent becomes low, and the amount of $NO_x$ held in the $NO_x$ absorbent is always kept lower than the $NO_x$ saturating amount even if the $NO_x$ absorbent is cooled after the engine has stopped.

According to the present invention, the $NO_x$ absorbing capacity of the $NO_x$ absorbent can be fully utilized by setting the regenerating amount of the $NO_x$ absorbent at a conventional value while preventing the $NO_x$ absorbent from releasing unreduced $NO_x$ into the atmosphere. This makes it possible to reduce the frequency of regenerating operation by using a $NO_x$ absorbent having a larger $NO_x$ absorbing capacity.

If a $NO_x$ absorbent having sufficiently large $NO_x$ absorbing capacity is used, i.e., if the $NO_x$ absorbing capacity of the $NO_x$ absorbent is larger than a total amount of $NO_x$ released from the engine during the whole engine operation period, the regenerating operation of the $NO_x$ absorbent is not required during the engine operation. However, in this case, the amount of $NO_x$ released from the $NO_x$ absorbent due to cooling becomes large. Further, even if the $NO_x$ is not released from the $NO_x$ absorbent after the engine has stopped, the amount of $NO_x$ held in the $NO_x$ absorbent does not decrease if the regenerating operation is not performed at all. This means that when the engine is restarted, the $NO_x$ absorbent has to start to absorb $NO_x$ in the exhaust gas in the condition where the amount of $NO_x$ absorbed therein is already relatively high. This may cause the $NO_x$ absorbent to saturate with $NO_x$ during the next operation of the engine.

According to the present invention, this problem also can be solved. Since the $NO_x$ absorbent is regenerated every engine stop, when the engine is restarted, the $NO_x$ absorbent is always capable of starting to absorb $NO_x$ in the condition where the amount of the absorbed $NO_x$ in the $NO_x$ absorbent is very low. This prevents the $NO_x$ absorbent from being saturated with $NO_x$ in the exhaust gas during the engine operation if a $NO_x$ absorbent having a sufficiently large $NO_x$ absorbing capacity. Namely, according to the present invention, the necessity for the regenerating operation of the $NO_x$ absorbent during the engine operation, and the resulting deterioration of the driveability and worsening of the fuel economy, can be eliminated by using a $NO_x$ absorbent having a sufficiently large $NO_x$ absorbing capacity.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
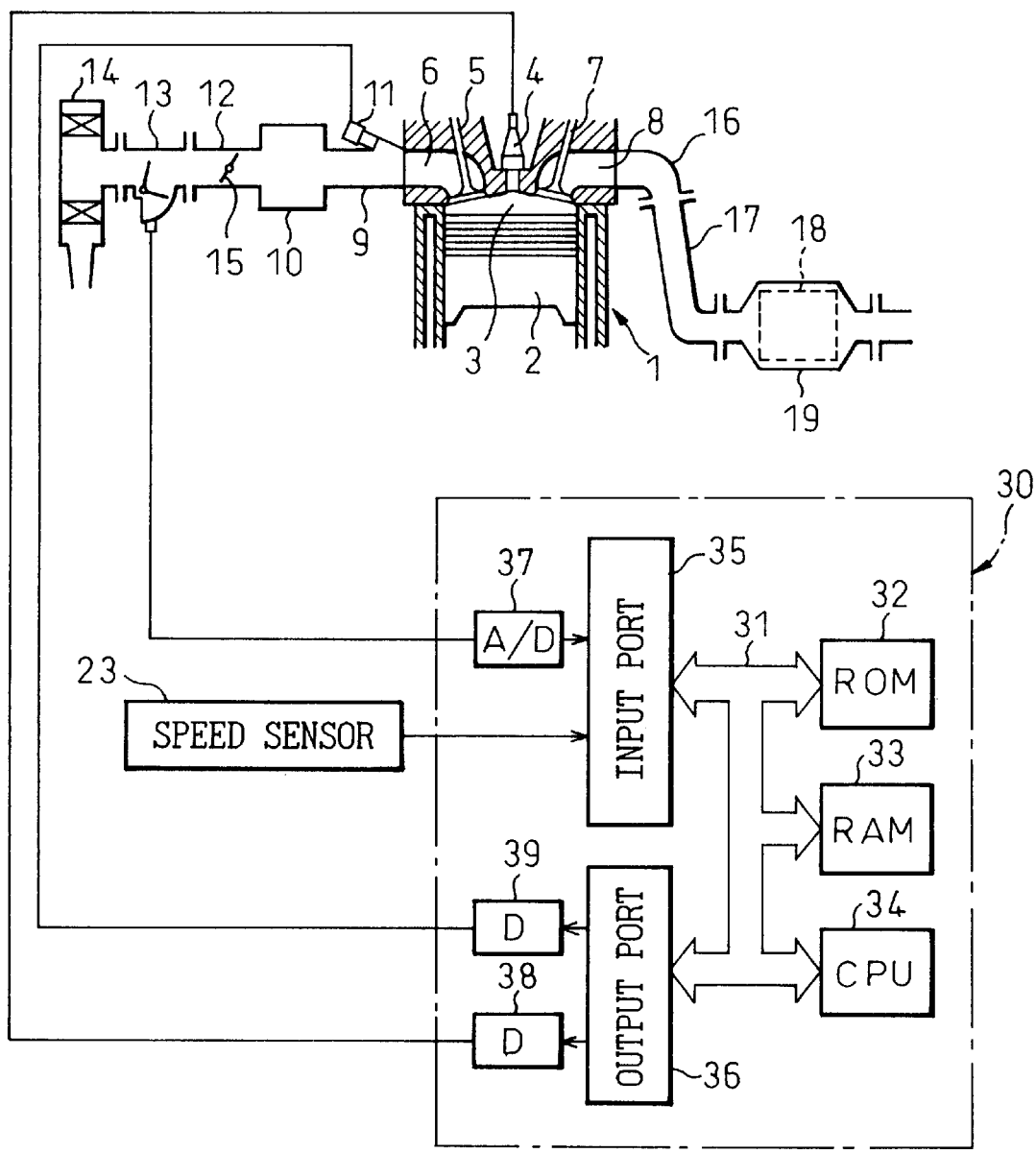
FIG. 1 schematically illustrates an embodiment of the exhaust gas purification device according to the present invention when it is applied to an internal combustion engine for an automobile.

FIG. 1 is a drawing schematically illustrating the general configuration of an embodiment of the present invention when it is applied to an internal combustion engine for an automobile.

In FIG. 1, reference numeral 1 represents an internal combustion engine for an automobile. In this embodiment, the engine 1 is a multi-cylinder type engine, and FIG. 1 shows one of the cylinders of the engine 1.

In FIG. 1, the respective cylinders are provided with a combustion chamber 3, a piston 2, an ignition plug 4, an intake port 6 with an intake valve 5 and an exhaust port 8 with an exhaust valve 7. The intake ports 6 of the respective cylinders are connected to a surge tank 10 by an intake manifold 9 and, on the intake manifold 9, a fuel injection valve 11 is disposed near each intake port 6. The fuel injection valves 11 inject pressurized fuel into the intake port 6 of the respective cylinders.

The surge tank 10 is connected to an intake air filter 14 via an intake air duct 12 and an air-flow meter 13. Numeral 15 represents a throttle valve disposed in the intake air duct 12.

The exhaust ports 8 of the respective cylinders are connected to a common exhaust pipe 17 by means of an exhaust manifold 16. On the exhaust pipe 17, a casing 19 containing a $NO_x$ absorbent 18 is disposed. The $NO_x$ absorbent 18 will be explained later in detail.

Reference numeral 30 in FIG. 1 represents a control circuit of the engine 1. The control circuit 30 consists of, for example, a microcomputer provided with a ROM (read only memory) 32, a RAM (random access memory) 33, a CPU (microprocessor) 34, an input port 35 and an output port 36, which are interconnected by a bi-directional bus 31.

The airflow meter 13 is, for example, a potentiometer-type which generates an analog voltage signal proportional to the amount of air flowing therethrough and drawn into the engine 1. The signal from the airflow meter 13 is transmitted to the input port 35 of the control circuit 30 through an analog-to-digital (A/D) converter 37. Further, pulse signal representing the rotational speed of the engine 1 is transmitted to the input port 35 from a speed sensor 23 disposed near the crankshaft of the engine 1.

The output port 36 is connected to the fuel injection valves 11 and the ignition plugs 4 of the respective cylinders via a drive circuit 39 and an ignition circuit 38, respectively.

Figure 2:
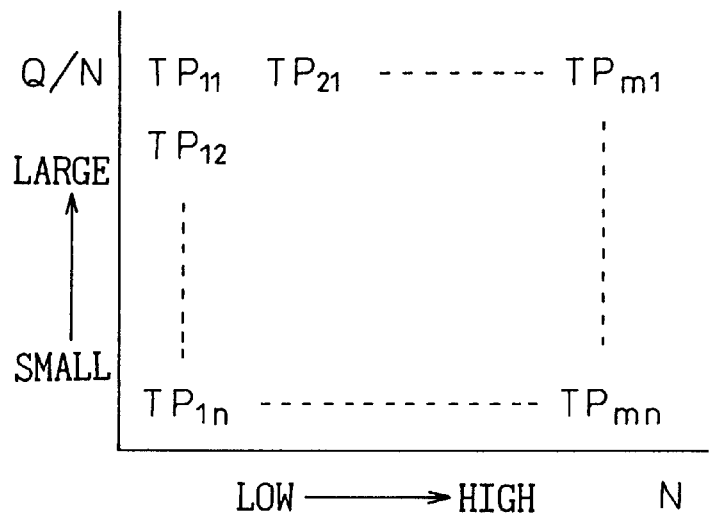
FIG. 2 shows an example of a numerical table used in the fuel injection amount calculation.

In this embodiment, the control circuit 30 calculates the amount of the fuel injection TAU in an fuel injection amount calculating operation (not shown) based on the formula TAU=TP×Kt, where TP represents a base fuel injection amount and Kt represents a correction factor. The base fuel injection amount TP is an amount of the fuel required to maintain the air-fuel ratio of the air-fuel mixture in the combustion chamber at a stoichiometric air-fuel ratio. The value of the base fuel injection amount TP is determined by, for example, experiment using an actual engine, and is stored in the ROM 32 of the control circuit 30 in the form of a numerical table based on the engine load conditions (such as the amount of intake air per one revolution of the engine, Q/N and engine speed N) as parameters. FIG. 2 shows a typical form of the numerical table used for calculating the base fuel injection amount TP.

The correction factor Kt is used for adjusting the operating air-fuel ratio of the engine (i.e., the air-fuel ratio of the air-fuel mixture supplied to the combustion chambers of the engine 1. When Kt is set at 1.0, the operating air-fuel ratio of the engine becomes the stoichiometric air-fuel ratio. When the correction factor Kt is set at Kt<1.0, the operating air-fuel ratio of the engine becomes higher than the stoichiometric air-fuel ratio, i.e., the engine is operated at a lean air-fuel ratio. On the contrary, when the correction factor Kt is set at Kt>1.0, the operating air-fuel ratio of the engine becomes lower than the stoichiometric air-fuel ratio, i.e., the engine 1 is operated at a rich air-fuel ratio.

In this embodiment, the value of Kt is maintained at, for example, Kt=0.7 in the usual operation of the engine 1 to operate the engine 1 at a lean air-fuel ratio.

Figure 3:
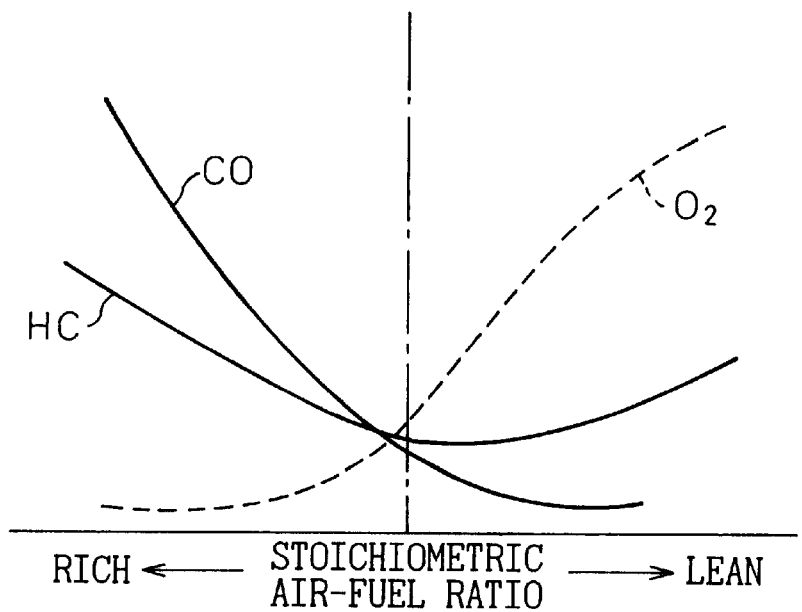
FIG. 3 shows a typical change in the composition of exhaust gas of an internal combustion engine according to the change in the operating air-fuel ratio of the engine.

FIG. 3 schematically illustrates the changes in the concentrations of $O_2$ and unburned HC, CO in the exhaust gas in accordance with the change in the operating air-fuel ratio of the engine 1. As shown in FIG. 3, the concentrations of unburned HC and CO increase as the operating air-fuel ratio of the engine becomes rich, and the concentration of $O_2$ increases as the operating air-fuel ratio becomes lean.

The $NO_x$ absorbent 18 in this embodiment uses, for example, alumina as a carrier and, on this carrier, precious metals such as platinum Pt rhodium Rh and at least one substance selected from alkali metals such as potassium K, sodium Na, lithium Li and cesium Cs; alkali-earth metals such as barium Ba and calcium Ca; and rare-earth metals such as lanthanum La and yttrium Y are carried. The $NO_x$ absorbent 18 absorbs $NO_x$ in the exhaust gas flowing into the $NO_x$ absorbent when the air-fuel ratio of the exhaust gas is lean, and releases the absorbed $NO_x$ When the oxygen concentration of the exhaust gas flowing into the $NO_x$ absorbent becomes lower.

In this specification, the term "air-fuel ratio of the exhaust gas" means a ratio of the amounts of the air and the fuel supplied to the engine or exhaust passages upstream of the $NO_x$ absorbent 18. Therefore, when no air and fuel (or a combustible substance) is supplied in the exhaust passage upstream of the $NO_x$ absorbent 18, the air-fuel ratio of the exhaust gas becomes the same as the operating air-fuel ratio of the engine (i.e., the air-fuel ratio of the air-fuel mixture supplied to combustion chambers of the engine).

Figure 4A:
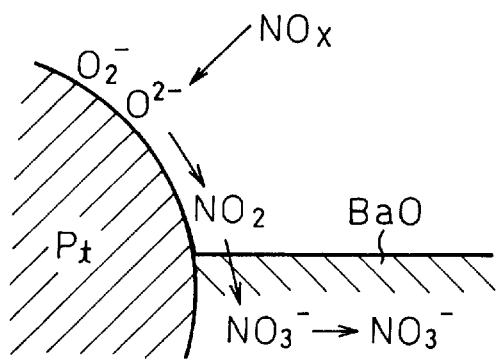
FIGS. 4A and 4B illustrates a mechanism of an absorbing and releasing operation of a $NO_x$ absorbent.
Figure 4B:
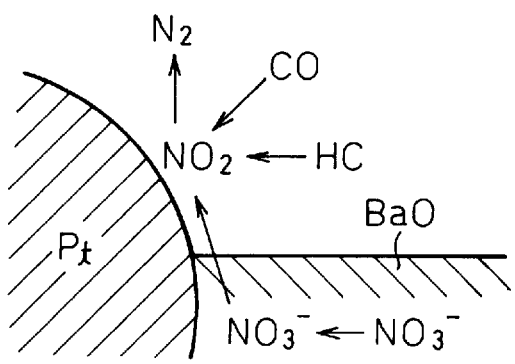

When the $NO_x$ absorbent is disposed in the exhaust passage of the engine, the $NO_x$ absorbent actually performs the above-mentioned absorption and releasing operation of $NO_x$. Though the mechanism of this absorption and releasing operation of the $NO_x$ absorbent is not clear at present, it is thought that the absorption and releasing operation is conducted by the mechanism shown in FIGS. 4A and 4B. FIGS. 4A and 4B explain the mechanism of the absorption and the releasing operation in the case where platinum Pt and barium Ba are carried on the carrier, as an example, but it is thought that a similar mechanism also applies if other precious metal, alkali metals, alkali earth metals, or rare earth metals are used.

Namely, when the air-fuel ratio of the exhaust gas is lean, the concentration of oxygen in the exhaust gas becomes quite high. In this case, as shown in FIG. 4A, the oxygen $O_2$ is deposited on the surface of platinum Pt in the form of $O_2^-$ or $O^{2-}$. The NO in the exhaust gas reacts with $O_2^-$ or $O^{2-}$ on the surface of the platinum Pt and becomes $NO_2$ ($2NO + O_2 \rightarrow 2NO_2$). Then, a part of the produced $NO_2$ is oxidized on the platinum Pt and absorbed into the $NO_x$ absorbent. While bonding with the barium oxide BaO, it is diffused in the absorbent in the form of nitric acid ions $NO_3^-$ as shown in FIG. 4A. In this way, $NO_x$ is absorbed in the $NO_x$ absorbent.

As long as the oxygen concentration in the exhaust gas is high, the $NO_x$ is produced on the surface of the platinum Pt, and as long as the $NO_x$ is produced on the surface of the platinum Pt, and as long as the $NO_x$ absorption capacity of the absorbent is not saturated, the $NO_x$ is absorbed into the $NO_x$ absorbent and nitric acid ions $NO_3^-$ are produced.

On the other hand, when the oxygen concentration in the exhaust gas becomes low, the production of $NO_2$ is lowered and the reaction proceeds in an inverse direction ($NO_3^- \rightarrow NO_2$), and thus nitric acid ions $NO_3^-$ in the absorbent are released in the form of $NO_2$ from the $NO_x$ absorbent. Namely, when the oxygen concentration of the exhaust gas flowing into the $NO_x$ absorbent is lowered, absorbed $NO_x$ is released from the $NO_x$ absorbent. As explained in FIG. 3, the oxygen concentration in the exhaust gas decreases as the operating air-fuel ratio of the engine becomes lower. Therefore, even when the operating air-fuel ratio of the engine is lean compared to the stoichiometric air-fuel ratio, $NO_x$ is released from the $NO_x$ absorbent when the air-fuel ratio of the exhaust gas approaches to the stoichiometric air-fuel ratio.

In this case, if the operating air-fuel ratio of the engine is rich compared to the stoichiometric air-fuel ratio, a relatively large amount of HC, CO are contained in the exhaust gas, and these components react with the oxygen $O_2^-$ or $O^{2-}$ on the platinum Pt and are oxidized. After oxygen $O_2^-$ or $O^{2-}$ on the platinum Pt are consumed by HC, CO in the exhaust gas, if HC and CO still remain in the exhaust gas, $NO_x$ released from the $NO_x$ absorbent as well as $NO_x$ emitted from the engine are reduced by the HC and CO remaining on the platinum Pt. This oxidation of the HC and CO consumes the oxygen existing near the $NO_x$ absorbent, and the concentration of oxygen in the atmosphere around the $NO_x$ absorbent is lowered. Also, the $NO_2$ released from the $NO_x$ absorbent reacts with the HC and CO in the exhaust gas as shown in FIG. 4B and is reduced to $N_2$. In this way, when the $NO_2$ on the surface of the platinum Pt reacts with HC and CO in the exhaust gas, and when the $NO_2$ no longer exists on the surface of the platinum Pt, the $NO_2$ is successively released from the absorbent. Accordingly, when HC and CO exist in the exhaust gas flowing into the $NO_x$ absorbent, the $NO_x$ is released from $NO_x$ absorbent and quickly reduced to $N_2$.

In this case, the HC and CO in the exhaust gas immediately react with the $O_2^-$ or $O^{2-}$ on the platinum Pt and are oxidized, and subsequently if the HC and CO still remain after the $O_2^-$ or $O^{2-}$ on the platinum Pt are consumed, the $NO_x$ released from the absorbent and the $NO_x$ emitted from the engine are reduced.

The engine 1 in FIG. 1 is usually operated at a lean air-fuel ratio (for example, Kt=0.7). Therefore, the $NO_x$ emitted from the engine 1 is absorbed by the $NO_x$ absorbent 18 during the usual operation. However, when the amount of $NO_x$ accumulated in the $NO_x$ absorbent increases, the $NO_x$ absorbent is saturated with $NO_x$, and the capability of the $NO_x$ absorbent for absorbing $NO_x$ falls. Further, when the amount of $NO_x$ accumulated in the $NO_x$ absorbent reaches the maximum amount of $NO_x$ which the $NO_x$ absorbent can hold (i.e., the $NO_x$ saturating amount of the $NO_x$ absorbent), the $NO_x$ absorbent 18 cannot absorb $NO_x$ in the exhaust gas any more, and $NO_x$ emitted from the engine is directly released to the atmosphere.

Figure 5:
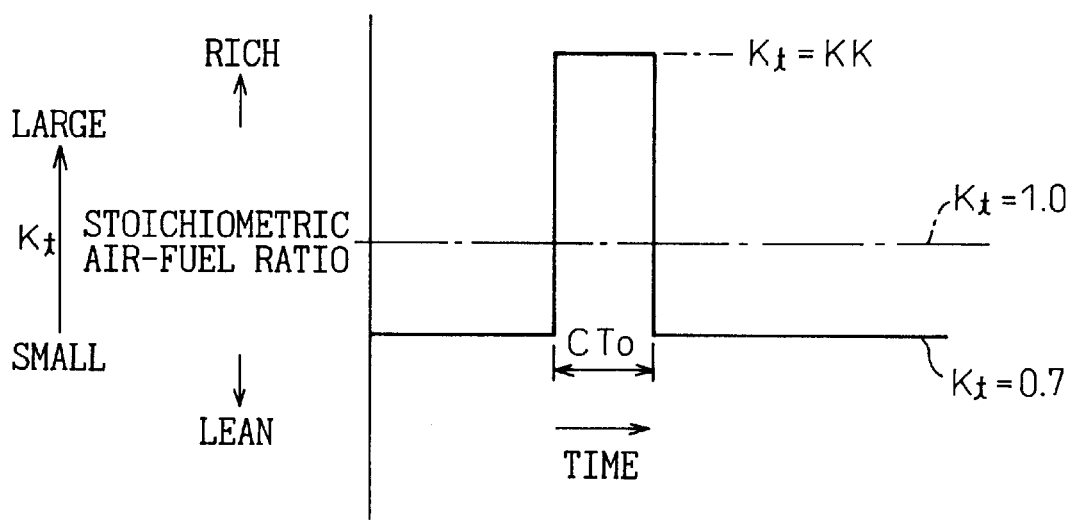
FIG. 5 illustrates the operating air-fuel ratio of the engine in FIG. 1 during the regenerating operation of the $NO_x$ absorbent.

Therefore, this embodiment detects the amount of $NO_x$ absorbed in the $NO_x$ absorbent 18 and operates the engine at a rich air-fuel ratio (for example, Kt=KK>1.0) for a predetermined period $CT_0$ (FIG. 5) when the amount of $NO_x$ absorbed in the $NO_x$ absorbent increases to a predetermined value (i.e., a regenerating amount). This predetermined value is usually set at, for example, 70 to 80% of the maximum $NO_x$ saturating amount, i.e., the $NO_x$ absorbing capacity of the $NO_x$ absorbent 18. By operating the engine at a rich air-fuel ratio, as explained above, $NO_x$ absorbed in the $NO_x$ absorbent is released, and reduced by HC and CO in the exhaust gas. Namely, in this embodiment, the regenerating operation of the $NO_x$ absorbent 18 is performed every time the amount of $NO_x$ absorbed in the $NO_x$ absorbent 18 reaches the regenerating amount.

Next, the method for detecting the amount of $NO_x$ absorbed in the $NO_x$ absorbent 18 will be explained. In this embodiment, the amount of $NO_x$ absorbed in the $NO_x$ absorbent 18 is detected indirectly by a calculation based on the engine load condition.

The amount of $NO_x$ emitted from the engine per unit time changes in accordance with the engine load condition (such as Q/N and N). The amount of $NO_x$ absorbed in the $NO_x$ absorbent per unit time increases as the amount of $NO_x$ emitted from the engine per unit time increases. Therefore, the total amount of $NO_x$ absorbed by the $NO_x$ absorbent can be calculated by adding the amount of $NO_x$ emitted from the engine per unit time. In this embodiment, a $NO_x$ counter CR is used as a parameter representing the amount of $NO_x$ absorbed in the $NO_x$ absorbent 18. The $NO_x$ counter CR is obtained by adding the values of the amount of $NO_x$ emitted from the engine 1 multiplied by a predetermined constant, as explained later.

Figure 6:
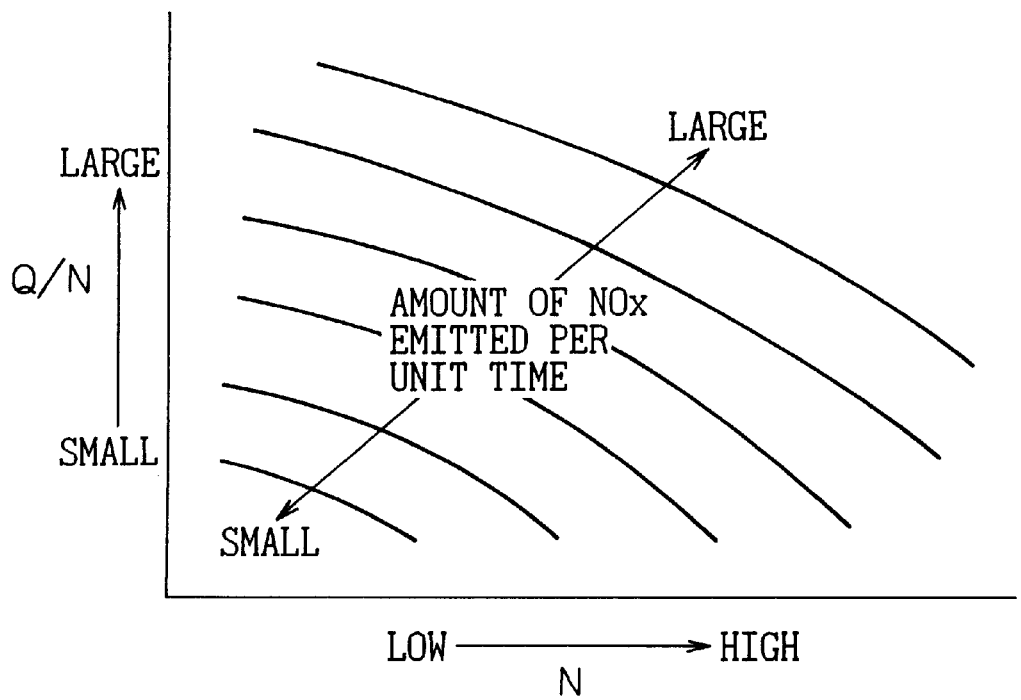
FIG. 6 illustrates a typical change in the amount of $NO_x$ generated by an internal combustion engine per unit time according to the change in the load conditions of the engine.

FIG. 6 illustrates a typical change in the amount of $NO_x$ emitted from an internal combustion engine in accordance with the change in the engine load condition. In FIG. 6, the vertical axis represents the amount of intake air per one revolution of the engine (Q/N) and the horizontal axis represents the engine speed (N). The curves show the amount of $NO_x$ emitted from the engine per unit time. As seen from FIG. 6, the amount of $NO_x$ emitted from the engine per unit time increases as the engine speed N increases when Q/N is the same, and also increases as Q/N increases when the engine speed N is the same. In this embodiment, the amount of $NO_x$ emitted from the engine per unit time is determined by, for example, experiment in which the actual engine is operated under various load conditions, and stored in the ROM 32 of the control circuit 30 in the form of a numerical table based on Q/N and N similar to that in FIG. 2. During the engine operation, the control circuit 30 determines the amount of $NO_x$ emitted from the engine from the numerical table periodically based on Q/N and N, and calculates the value of the $NO_x$ counter CR by adding the values obtained by multiplying the values determined from the numerical table by a constant.

Figure 7:
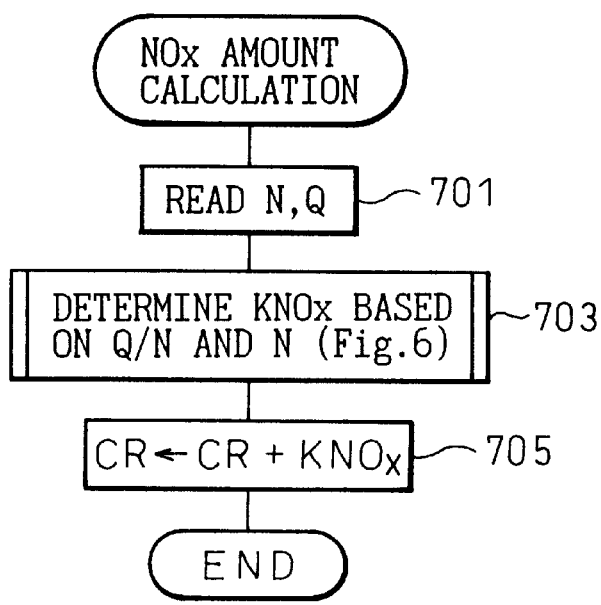
FIG. 7 is a flowchart illustrating an example of a calculating (detecting) operation of the amount of $NO_x$ absorbed in the $NO_x$ absorbent in FIG. 1.

FIG. 7 shows a flowchart illustrating the operation for calculating the amount of $NO_x$ absorbed in the $NO_x$ absorbent 18 in this embodiment. This operation is performed by a routine executed by the control circuit 30 at predetermined intervals.

When the operation starts, in FIG. 7, at step 701, control circuit 30 reads the engine speed N and the amount of intake airflow Q from the sensors 23 and 13, respectively. At step 703, the amount of intake air per one revolution of the engine Q/N is calculated, and the amount $KNO_x$ of $NO_x$ emitted from the engine 1 per unit time is determined from the numerical table stored in the ROM 32 based on the calculated Q/N and N. The value of the $NO_x$ counter CR is obtained by adding the value of $KNO_x$ at step 705.

Although the value of the $NO_x$ counter CR is calculated based on the amount of $NO_x$ omitted from the engine 1 per unit time, since the amount of $NO_x$ absorbed in the $NO_x$ absorbent increases as the engine operation time elapses, the value of the CR may be approximately determined by increasing the value of CR by a constant value at regular intervals.

Figure 8:
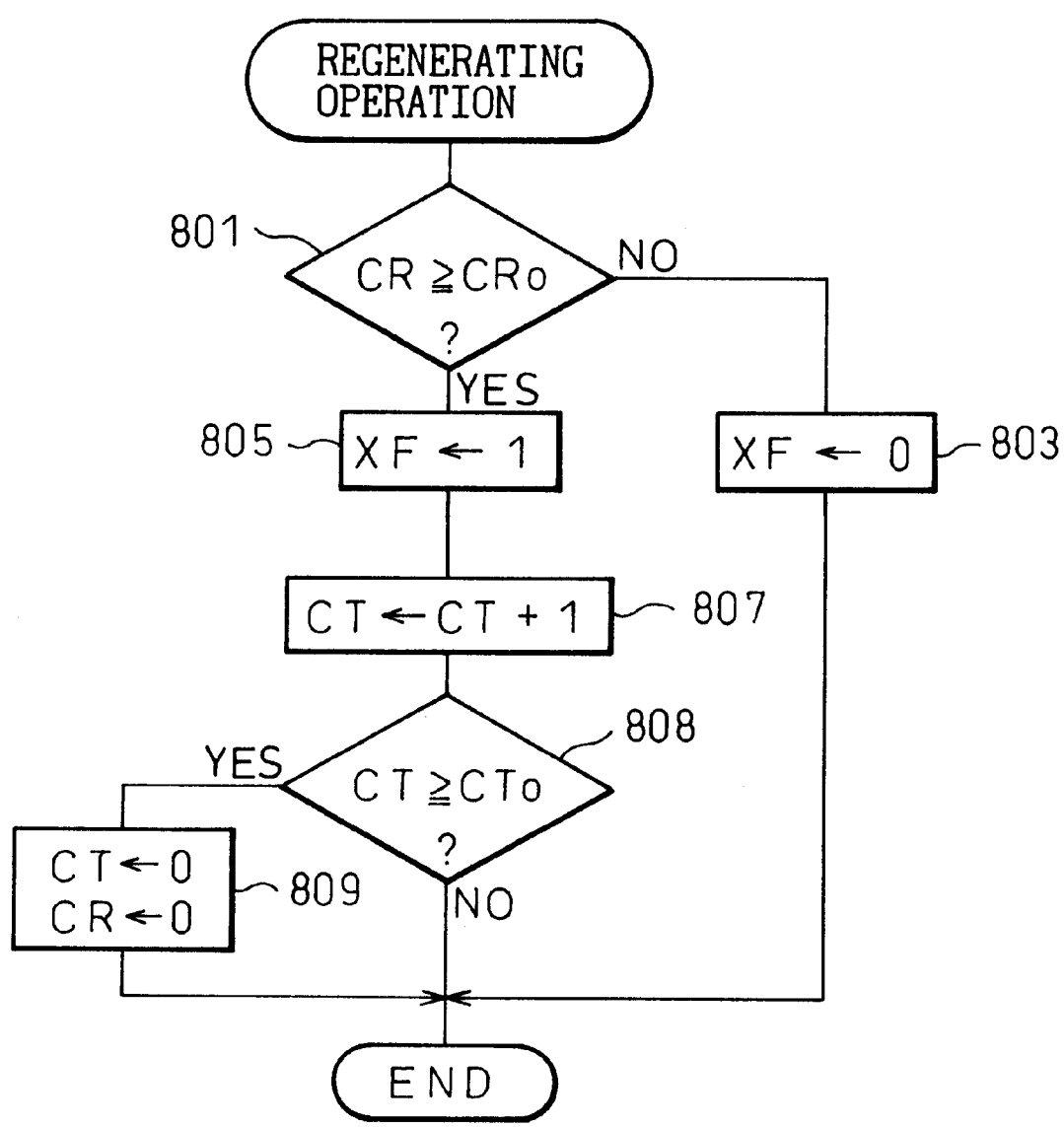
FIG. 8 is a flowchart illustrating an example of the regenerating operation of the $NO_x$ absorbent.

In FIG. 8, at step 801, it is determined whether the regenerating operation of the $NO_x$ absorbent 18 is required, i.e., whether the value of the $NO_x$ counter CR has reached a predetermined value $CR_0$. The value $CR_0$ in this embodiment is, for example, set at a value between 70 and 80% of the maximum $NO_x$ saturation amount KMAX, as explained later.

FIG. 8 shows a flowchart explaining the regenerating operation of the $NO_x$ absorbent 18 in this embodiment. This operation is performed by a routine executed by the control circuit 30 at predetermined intervals.

If $CR<CR_0$ at step 801, since the amount of $NO_x$ absorbed in the $NO_x$ absorbent 18 is small and the regenerating operation thereof is not necessary, the operation immediately terminates after setting the value of a regeneration flag XF to 0 at step 803. When the value of the flag XF is set to 0, the value of correction factor Kt used in the fuel injection amount calculation is set to 0.7 and the engine 1 is operated at a lean air-fuel ratio. In this case, the $NO_x$ absorbent 18 continues to absorb $NO_x$ in the exhaust gas.

On the other hand, if $CR \geq CR_0$ at step 801, since the amount of $NO_x$ absorbed in the $NO_x$ absorbent has increased, the operation proceeds to step 805 to set the value of the flag XF to 1. When the value of the flag XF is set to 1, the value of the correction factor Kt is set to KK. KK is a value larger than 1.0, and in this embodiment, the value of KK is set at about 1.04, therefore, when the correction factor Kt is set to KK at step 805, the operating air-fuel ratio of the engine 1 is shifted to a rich air-fuel ratio. Thus, exhaust gas with a rich air-fuel ratio flows into the $NO_x$ absorbent 18, and the absorbed $NO_x$ is released from the $NO_x$ absorbent and reduced by HC, CO in the exhaust gas.

Steps 807 through 809 are the steps for terminating the regenerating operation. The regenerating operation in this embodiment terminates when a predetermined time has elapsed from the beginning of the regenerating operation. Namely, a time counter CT is increased by 1 at step 807 and, when the value of CT reaches a predetermined value $CT_0$ at step 808, the values of CT and CR are reset to 0. When the values of CR is set to 0, the operation executes step 803 after step 801 and, thereby, the value of the regeneration flag XF is set to 0 when the operation is next performed. Thus, the operating air-fuel ratio of the engine 1 is reset to a lean air-fuel ratio (Kt=0.7) after the regenerating operation is performed for a period corresponding to the value $CT_0$ of the time counter. The value $CT_0$ is set at a value sufficient for releasing the amount of $NO_x$ corresponding to the value $CR_0$ of the $NO_x$ counter from the $NO_x$ absorbent 18. Since the value $CT_0$ varies depending on the type and size of the $NO_x$ absorbent, the value $CT_0$ is determined by, for example, experiment using the actual $NO_x$ absorbent.

By performing the operation in FIG. 8, since the regenerating operation is performed when the amount of $NO_x$ absorbed in the $NO_x$ absorbent reaches the predetermined regenerating amount, unreduced $NO_x$ is never released from the $NO_x$ absorbent during the engine operation. However, by the above operation, unreduced $NO_x$ may be released from the $NO_x$ absorbent after the engine has stopped if the engine is stopped when the amount of $NO_x$ absorbed in the $NO_x$ absorbent is relatively large. This problem will be explained in detail with reference to FIG. 9.

Figure 9:
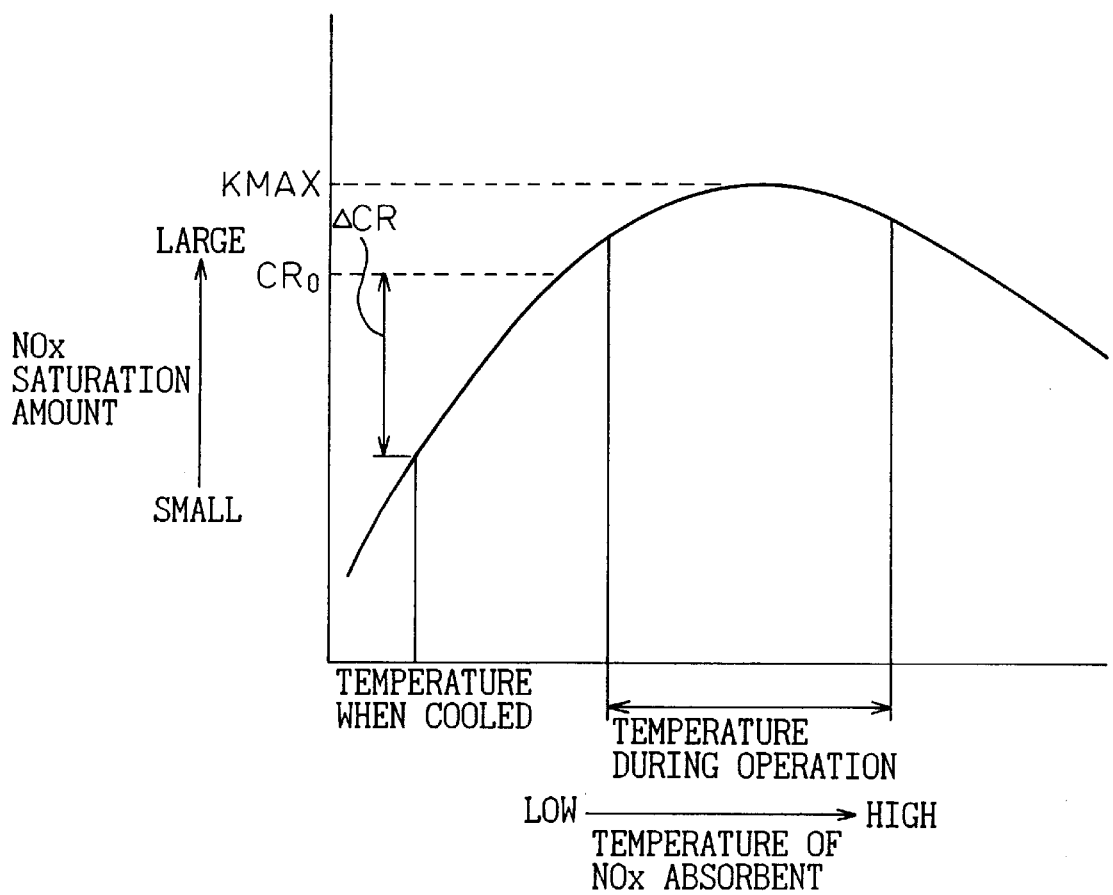
FIG. 9 illustrates a typical change in the $NO_x$ saturating amount of the $NO_x$ absorbent according to the change in the temperature thereof.

FIG. 9 illustrates the change in the maximum amount of $NO_x$ held by the $NO_x$ absorbent in accordance with the change in the temperature of the $NO_x$ absorbent. The maximum amount which the $NO_x$ absorbent can hold therein, i.e., the $NO_x$ saturation amount changes in accordance with the temperature. The $NO_x$ absorbent cannot hold an amount of $NO_x$ in excess of the $NO_x$ saturation amount determined by the temperature as shown in FIG. 9. The $NO_x$ absorbent holds $NO_x$ therein in the form of nitrate. Since the capacity of the $NO_x$ absorbent for holding nitrate increases when the temperature is not very high, the $NO_x$ saturation amount of the $NO_x$ absorbent increases as the temperature increases in a relatively low temperature range. However, when the temperature further increases, nitrate held in the $NO_x$ absorbent starts to decompose due to high temperature, and the $NO_x$ saturation amount starts to decrease as the temperature increases. Therefore, the $NO_x$ saturation amount reaches its maximum value (i.e., KMAX in FIG. 9) at a certain temperature. Usually, the $NO_x$ absorbent is disposed in the exhaust gas passage at the position where the temperature of the $NO_x$ absorbent becomes a temperature near the temperature at which the maximum $NO_x$ saturation amount (KMAX in FIG. 9) is obtained (for example, 300 to 500° C.) during the engine operation in order to fully utilize the capacity of the $NO_x$ absorbent for absorbing $NO_x$.

The operation in FIG. 8 performs the regenerating operation when the amount of $NO_x$ absorbed in the $NO_x$ absorbent reaches the regenerating amount (the amount corresponding to the value of $CR_0$). Therefore, if the engine is stopped immediately before the amount of $NO_x$ absorbed in the $NO_x$ absorbent reaches the regenerating amount, the amount of $NO_x$ corresponding to the regenerating amount remains in the $NO_x$ absorbent after the engine has stopped. In this condition, if the $NO_x$ absorbent is cooled after the engine has stopped, the amount of $NO_x$ in excess of the $NO_x$ saturation amount at the temperature of the $NO_x$ absorbent after it is cooled is released. Since the atmosphere in the exhaust gas passage and the $NO_x$ absorbent is very lean (almost the same as the air-fuel ratio of the ambient air) when the engine is not operated, the $NO_x$ released from the $NO_x$ absorbent diffuses to the atmosphere without being reduced. The amount of unreduced $NO_x$ released from the $NO_x$ absorbent is expressed by $\Delta CR$ in FIG. 9, if the $NO_x$ absorbent holds the amount of $NO_x$ corresponding to $CR_0$ when the engine is stopped.

If the engine is restarted before the $NO_x$ absorbent is cooled, unreduced $NO_x$ is not released from the $NO_x$ absorbent. However, in this case, the $NO_x$ absorbent starts to absorb $NO_x$ in the exhaust gas in the condition where a relatively large amount of $NO_x$ is already held in the $NO_x$ absorbent. Therefore, if the value of the $NO_x$ counter CR is not retained until the engine is restarted, i.e., if the value of the $NO_x$ counter is reset to its initial value 0 when the engine is restarted, the $NO_x$ absorbent is easily saturated with the absorbed $NO_x$ during the engine operation. This causes $NO_x$ emitted from the engine to diffuse into the atmosphere without being absorbed by the $NO_x$ absorbent.

Therefore, in this embodiment, the regenerating operation of the $NO_x$ absorbent is performed when the engine is stopped in order to prevent the $NO_x$ absorbent from releasing unreduced $NO_x$ after the engine has stopped. By performing the regenerating operation when the engine is stopped, substantially no $NO_x$ remains in the $NO_x$ absorbent after the engine has stopped. Therefore, unreduced $NO_x$ is not released from the $NO_x$ absorbent even though the $NO_x$ absorbent is cooled after the engine has stopped. Further, since the $NO_x$ absorbent can start absorbing $NO_x$ in the exhaust gas in the condition where no $NO_x$ is held therein when the engine is next started, the accumulation of $NO_x$ and resulting saturation of the $NO_x$ absorbent during the engine operation can be avoided. Especially, this feature is advantageous when a $NO_x$ absorbent having a very large $NO_x$ absorbing capacity is used. If the $NO_x$ absorbent having a $NO_x$ absorbing capacity sufficiently large for absorbing and holding all the $NO_x$ emitted from the engine during the whole operation, the regenerating operation during the engine operation is not required, and the regenerating operation can be performed only when the engine is stopped. Since the regenerating operation during the engine operation requires the operating air-fuel ratio of the engine to be shifted to a rich air-fuel ratio, fluctuation of the output torque of the engine and resulting deterioration of the driveability occurs. Therefore, if a $NO_x$ absorbent having a large $NO_x$ absorbing capacity is used, since the regenerating operation during the engine operation is not required, the deterioration of the driveability, or a worsening of the fuel economy due to frequent rich air-fuel ratio operation of the engine will not occur according to the present embodiment.

Figure 10:
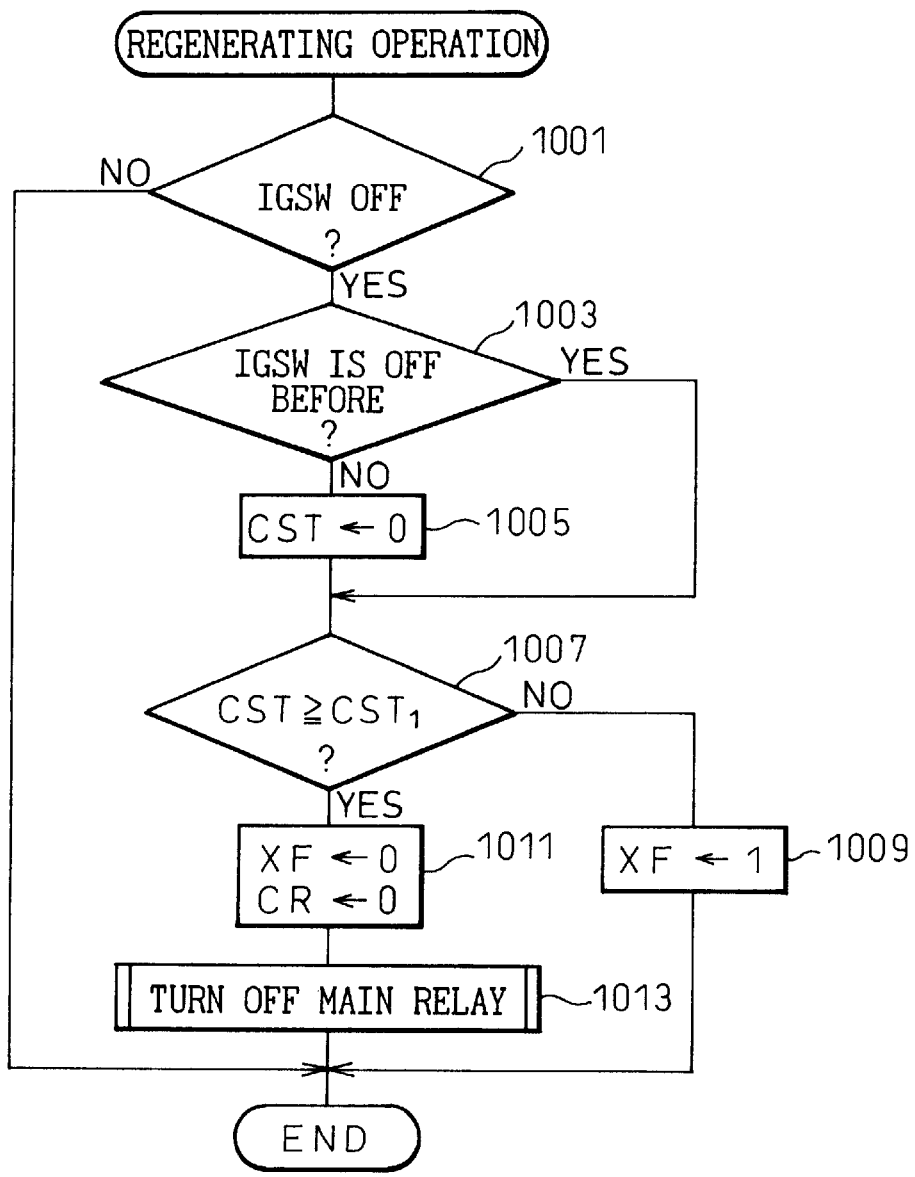
FIG. 10 is a flowchart illustrating an example of the regenerating operation of the $NO_x$ absorbent which is performed after the engine has stopped.

FIG. 10 is a flowchart illustrating an embodiment of the regenerating operation performed when the engine is stopped. This operation is performed by a routine executed by the control circuit 30 at predetermined intervals.

In this embodiment, when the control circuit 30 determines that the engine is stopped, i.e., an engine stopping operation is performed by the operator of the engine (for example, when the ignition switch is turned off by the operator), it performs the regenerating operation of the $NO_x$ absorbent by keeping the engine 1 running and shifting the operating air-fuel ratio of the engine to a rich air-fuel ratio until a predetermined time has elapsed.

Namely, at step 1001 in FIG. 10, it is determined whether an ignition switch of the engine is off and, if the ignition switch is on, the operation terminates immediately without performing steps 1003 through 1013.

Figure 11:
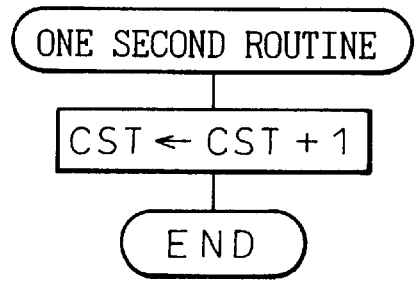
FIG. 11 is a flowchart illustrating a count up operation of a time counter used in the operation in FIG. 10.

If ignition switch is off at step 1001, the operation determines whether the ignition switch was off when the operation was last performed. If the ignition switch was on when the operation was last performed, this means that the operation is first performed after the ignition switch has been turned off. In this case, the operation resets a value of a time counter CST to 0 at step 1005 in order to measure the time elapsed after the ignition switch has been turned off before executing step 1007. If the ignition switch was off when the operation was last performed at step 1001, i.e., if the operation is not performed immediately after the ignition switch has been turned off, the operation directly proceeds to step 1007. CST is a counter increased by 1 at a second by a routine shown in FIG. 11, which is executed by the control circuit 30 at every one second. Therefore, after CST is reset to 0 at step 1005, the value of CST represents the time (seconds) elapsed after the ignition switch has been turned off.

At step 1007, it is determined whether a predetermined time $CST_1$ has elapsed since the ignition switch was turned off. If time $CST_1$ has not elapsed, i.e., if $CST<CST_1$ at step 1007, the operation terminates after setting the value of the regeneration flag XF to 1 at step 1009. If time $CST_1$ has elapsed, i.e., if $CST>CST_1$ at step 1007, the operation executes step 1011 to reset the values of the regeneration flag XF and the $NO_x$ counter CR to 0. After executing step 1011, the operation executes step 1013 to stop the operation of engine 1 by turning off a main relay. Namely, by executing steps 1007 through 1013, the engine is operated at a rich air-fuel ratio (XF=1) until a predetermined time ($CST_1$) has elapsed since the engine stopping operation commenced (i.e., since the ignition switch was turned off) and is stopped when the predetermined time ($CST_1$) has elapsed. The time $CST_1$ is a time sufficient for releasing all the amount of $NO_x$ from the $NO_x$ absorbent even if the amount of $NO_x$ corresponding to the value $CR_0$ of the $NO_x$ counter is held in the $NO_x$ absorbent. $CST_1$ is set at, for example, about 10 seconds in this embodiment, however, since the time $CST_1$ varies in accordance with the type and size of the $NO_x$ absorbent, it is preferable to determine the time $CST_1$ by, for example, experiment using the actual $NO_x$ absorbent.

By the operation in FIG. 10, since substantially all the $NO_x$ in the $NO_x$ absorbent is released and reduced when the engine is stopped, unreduced $NO_x$ is not released from the $NO_x$ absorbent after the engine has stopped. Further, since the $NO_x$ absorbent can start absorbing $NO_x$ in the condition where no $NO_x$ is held therein, the saturation of the $NO_x$ absorbent with absorbed $NO_x$ can be avoided during the engine operation.

Although the time $CST_1$ is set at a constant value in this embodiment, since the time required for regenerating the $NO_x$ absorbent is shorter as the amount of $NO_x$ held in the $NO_x$ absorbent is smaller, $CST_1$ may be changed in accordance with the amount of $NO_x$ absorbed in the $NO_x$ absorbent when the engine is stopped. In this case, it is necessary to obtain the relationship between the amount of $NO_x$ absorbed in the $NO_x$ absorbent (i.e., the value of the $NO_x$ counter CR) and the time ($CST_1$) required for regenerating the $NO_x$ absorbent by, for example, experiment using the actual $NO_x$ absorbent, and stores the required time $CST_1$ in the ROM 32 of the control circuit 30 as a numerical table using CR as a parameter. The required time $CST_1$ is determined from this numerical table using the value of the $NO_x$ counter when the engine is stopped.

Further, as explained before, if the $NO_x$ absorbing capacity of the $NO_x$ absorbent is sufficiently large, the regenerating operation during the engine operation (FIG. 8) is not required.

Further, though the regenerating operation when the engine is stopped (FIG. 10) starts after the engine stopping operation (i.e., the turning off of the ignition switch) is commenced in this embodiment, the regenerating operation may be started before the engine stopping operation is commenced. In this case, for example, a manual switch for generating a signal for starting the regenerating operation is provided to the engine, and the operator starts the regenerating operation manually using this switch before turning off the ignition switch. In this case, the regenerating operation is also performed until the time $CST_1$ has elapsed regardless of whether or not the ignition switch is turned off after the regenerating operation is started.

Figure 12:
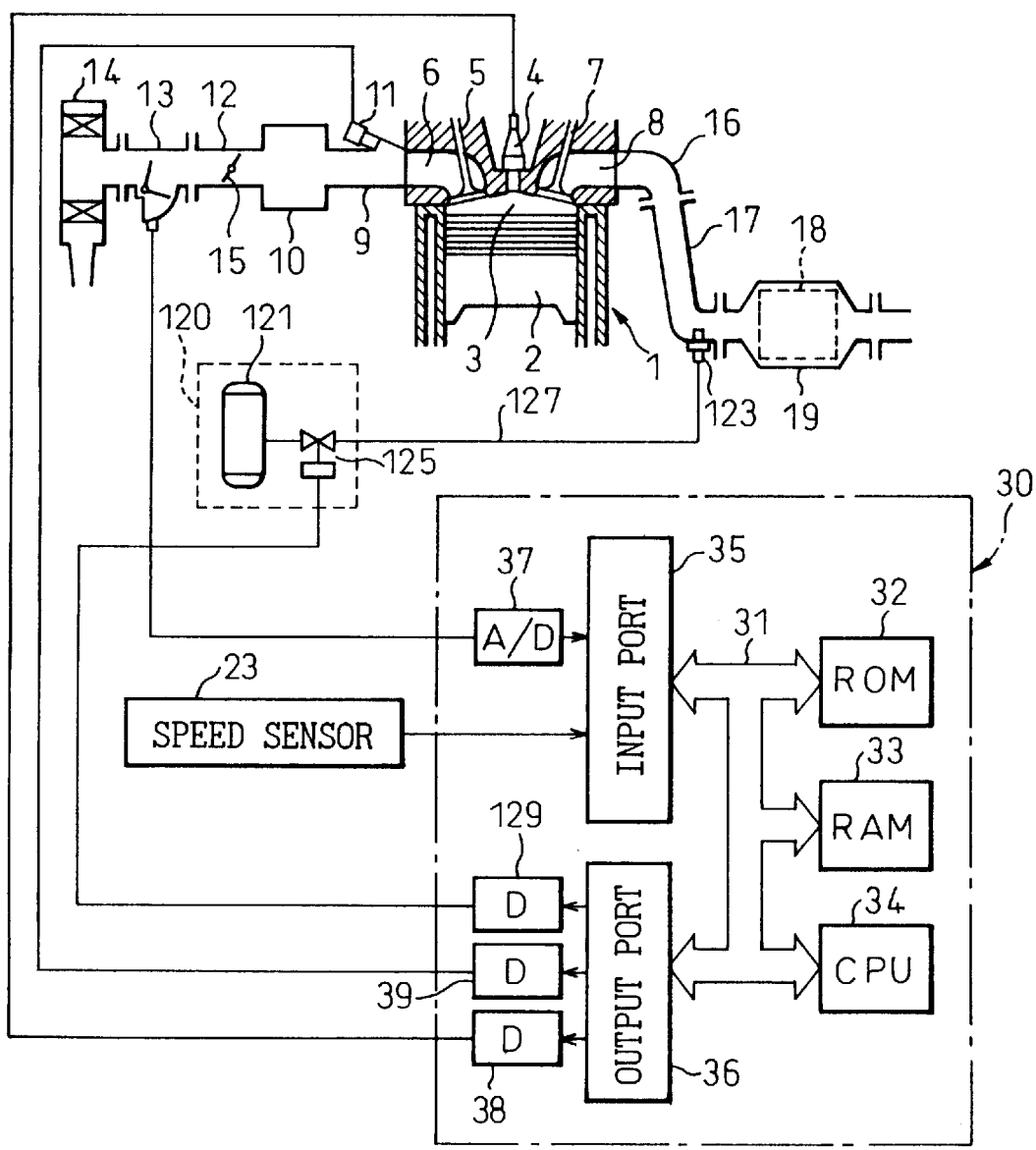
FIG. 12 schematically illustrates another embodiment of the exhaust gas purification device according to the present invention.

FIG. 12 schematically illustrates the general configuration of another embodiment of the exhaust gas purification device according to the present invention.

In FIG. 12, reference numerals the same as those in FIG. 1 designate similar elements.

In FIG. 12, a reducing agent supply unit 120 is provided. The reducing agent supply unit 120 includes a gaseous reducing agent source such as a vessel 121 storing pressurized gaseous reducing agent and a nozzle 123 disposed in the exhaust gas passage 17 upstream of the casing 19 of the $NO_x$ absorbent 18. A solenoid shut off valve 125 is provided on the conduit 127 connecting the nozzle 123 to the vessel 121. The solenoid shut off valve 125 opens and closes in accordance with a signal supplied from the output port 36 of the control circuit 30 via a drive circuit 129.

In this embodiment, when the ignition switch is turned off, the engine operation is immediately terminated and the valve 125 is opened to supply gaseous reducing agent to the $NO_x$ absorbent 18. The $NO_x$ absorbent 18 is regenerated by the reducing agent instead of the rich air-fuel ratio exhaust gas from the engine in this embodiment. The reducing agent used in this embodiment can be any gas having a reducing ability (such as hydrogen, carbon monoxide, ammonia) or gaseous hydrocarbon (such as propane, propylene). According to this embodiment, the operation of the engine can be stopped immediately after the ignition switch is turned off.

What is claimed is:

1. An exhaust gas purification device for an internal combustion engine comprising:

a $NO_x$ absorbent disposed in an exhaust passage of an internal combustion engine, said $NO_x$ absorbent absorbs $NO_x$ in the exhaust gas of the engine when the air-fuel ratio of the exhaust gas flowing into the $NO_x$ absorbent is lean, and releases and reduces the absorbed $NO_x$ when the air-fuel ratio of the gas flowing into the $NO_x$ absorbent becomes rich; and a regenerating means for performing a regenerating operation which causes the $NO_x$ absorbent to release and reduce the absorbed $NO_x$ by supplying rich air-fuel ratio gas to the $NO_x$ absorbent when the engine is stopped.

2. An exhaust gas purification device as set forth in claim 1, wherein said regenerating means starts the regenerating operation after an engine stopping operation is commenced.

3. An exhaust gas purification device as set forth in claim 2, wherein said regenerating means further performs the regenerating operation when a predetermined condition is satisfied during the engine operation.

4. An exhaust gas purification device as set forth in claim 3, further comprising $NO_x$ amount detecting means for detecting the amount of $NO_x$ absorbed in the $NO_x$ absorbent, and wherein said regenerating means performs the regenerating operation when the amount of $NO_x$ in the $NO_x$ absorbent reaches a predetermined value during the engine operation.

5. An exhaust gas purification device as set forth in claim 2, wherein said regenerating means performs the regenerating operation by operating the engine at a rich air-fuel ratio for a predetermined period after the engine stopping operation is commenced.

6. An exhaust gas purification device as set forth in claim 5, further comprising $NO_x$ amount detecting means for detecting the amount of $NO_x$ absorbed in the $NO_x$ absorbent and means for setting the length of the predetermined period in accordance with the amount of $NO_x$ absorbed in the $NO_x$ absorbent when the engine stopping operation is commenced.

7. An exhaust gas purification device as set forth in claim 5, wherein said regenerating means terminates the regenerating operation when substantially all of the $NO_x$ absorbed in the $NO_x$ absorbent is released from the $NO_x$ absorbent and reduced.

8. An exhaust gas purification device as set forth in claim 2, wherein said regenerating means performs the regenerating operation by supplying a reducing agent to the $NO_x$ absorbent for a predetermined period after the engine stopping operation is commenced.

9. An exhaust gas purification device as set forth in claim 8, further comprising $NO_x$ amount detecting means for detecting the amount of $NO_x$ absorbed in the $NO_x$ absorbent and means for setting the length of the predetermined period in accordance with the amount of $NO_x$ absorbed in the $NO_x$ absorbent when the engine stopping operation is commenced.

10. An exhaust gas purification device as set forth in claim 8, wherein said regenerating means terminates the regenerating operation when substantially all of the $NO_x$ absorbed in the $NO_x$ absorbent is released from the $NO_x$ absorbent and reduced.

11. An exhaust gas purification device as set forth in claim 2, wherein said regenerating means terminates the regenerating operation when substantially all of the $NO_x$ absorbed in the $NO_x$ absorbent is released from the $NO_x$ absorbent and reduced.

12. An exhaust gas purification device as set forth in claim 1, wherein said regenerating means further performs the regenerating operation when a predetermined condition is satisfied during the engine operation.

13. An exhaust gas purification device as set forth in claim 12, further comprising $NO_x$ amount detecting means for detecting the amount of $NO_x$ absorbed in the $NO_x$ absorbent, and wherein said regenerating means performs the regenerating operation when the amount of $NO_x$ in the $NO_x$ absorbent reaches a predetermined value during the engine operation.

* * * * *